United States Patent
Frame et al.

[15] 3,704,526
[45] Dec. 5, 1972

[54] RC CLUTCH STALL CIRCUIT FOR A DRIVER-TRAINER SIMULATOR

[72] Inventors: Wayne W. Frame; Roy A. Gustavson; James Wiltse, all of Michigan City, Ind.

[73] Assignee: Aetna Life & Casuality

[22] Filed: Dec. 23, 1970

[21] Appl. No.: 101,085

[52] U.S. Cl....................................................35/11
[51] Int. Cl................................................G09b 9/02
[58] Field of Search.........................................35/11

[56] References Cited

UNITED STATES PATENTS

| | | |
|---|---|---|
| 3,015,169 | 1/1962 | Chedister et al.................35/11 |
| 3,071,874 | 1/1963 | Chedister.......................35/11 |
| 3,154,864 | 11/1964 | Jazbutis.........................35/11 |
| 3,266,173 | 8/1966 | Sheridan........................35/11 |

*Primary Examiner*—Wm. H. Grieb
*Attorney*—Cushman, Darby & Cushman

[57] ABSTRACT

A method and apparatus for use in a driver trainer simulator of the type wherein a clutch pedal is provided for operation by the student under simulated driving conditions. In the embodiment described below, the clutch pedal is mechanically linked to a plurality of switches which each sequentially connect to a number of associated contacts as the pedal is pressed and released. One of these contacts is associated with the point at which the clutch pedal would be engaged in a conventional vehicle and when the switch is connected to this contact an associated capacitor is charged through a resistive network. The next contact encountered by the switch as the now engaged clutch pedal is further released connects the charged capacitor across a relay coil so that the relay remains activated only if the rate at which the clutch pedal was released through the friction point was slow enough for the capacitor to charge to a given level. Thus deactivation of the relay coil represents a popped clutch and causes controlled switches to produce an indication on the simulator that a stall condition has been produced.

10 Claims, 4 Drawing Figures

INVENTORS
WAYNE W. FRAME
ROY A. GUSTAVSON
JAMES WILTSE
BY Cushman, Darby & Cushman
ATTORNEYS

RC CLUTCH STALL CIRCUIT FOR A DRIVER-TRAINER SIMULATOR

BRIEF DESCRIPTION OF THE PRIOR ART AND SUMMARY OF THE INVENTION

The invention relates to a driver trainer simulator and more particularly to an arrangement for use in a driver trainer simulator having a clutch pedal so that the simulated engine function is reduced to a stall when the clutch is popped.

Driver training devices in which a student can learn the mechanics of driving a vehicle free from the dangers of actual driving conditions have become increasingly accepted as a valuable teaching aid. Such devices usually include a stationary seat mounted in conjunction with the usual control, such as accelerator, brake, clutch, gear shift and steering wheel, which are normally operated during actual vehicular operation. In addition, simulated indicators of vehicle conditions, such as speedometers, oil pressure gauges and generator gauges are usually mounted in their usual positions in the simulator and the readings on such indicators change in response to operation of the controls in the same fashion as in an actual vehicle.

Frequently a film projection system with a screen for each driver simulator or for a group of driver simulators is provided. Films of actual driving conditions are projected onto the screen or screens and each student responds to what he observes on the screen in the same fashion as he would respond to observations through the windshield of an actual vehicle. The responses which the student makes can be recorded and then compared at a later time with the responses he should have made in order to pinpoint and correct fundamental errors. One such driver training arrangement is described in detail in Chedister et al. U.S. Pat. No. 3,015,169 and the disclosure of this patent is explicitly incorporated herein by reference.

As mentioned briefly above, one of the controls which is normally provided in a driver trainer is a clutch pedal which the student operates just like a real clutch pedal. In order to teach the student how to use the clutch pedal properly, it is desirable that, when the clutch pedal on the driver simulator is popped, i.e., permitted to pass the engagement point too quickly, the simulated engine will stall and the student will be required to restart the simulator in the same fashion that he would be required to restart an actual vehicle. In the Chedister U.S. Pat. No. 3,071,874 which generally describes a driver trainer simulator which is equipped with a clutch pedal, the clutch pedal is mechanically linked to two rotatable inertial elements which are held normally in contact but which separate when the clutch is released too rapidly and then actuate a switch which in turn causes the simulated engine to stall. In another similar arrangement, a pendulating inertial hammer is attached to the simulated clutch pedal so that the hammer slams against a microswitch, closing it, when the clutch pedal is popped.

One of the difficulties of simulating the clutch stall condition in the manner described in the above-mentioned Chedister U.S. Pat. No. 3,071,874 is that tedious mechanical adjustments and alignments are required to properly install and adjust the inertial elements. Further the stall arrangement is sensitive to any rapid release of the clutch pedal rather than only to rapid release of the pedal past the actual point of engagement, which is, of course, the act which results in a stall in an actual vehicle.

Accordingly, the present invention as described in detail below relates to a clutch stall device for a driver trainer simulator wherein the clutch pedal is mechanically linked to a switch which moves through a plurality of contact positions as the clutch pedal is depressed and released. In the contact positions associated with disengaged portion of the clutch pedal travel, a capacitance connected to the moving switch arm is kept discharged. When the clutch pedal is released and moves to the point at which it would be engaged in an actual vehicle, the switch arm moves likewise into connection with another contact to that the capacitor is connected to a source of electrical potential via a resistive network and is charged to a voltage dependent upon the rate at which the clutch pedal moves past that point of engagement and the switch arm past the engaging contact and accordingly the time that the capacitor remains connected to the source of voltage. When the switch arm reaches the contact positions associated with the engaged portion of the clutch pedal travel, the capacitor is connected to an activated relay coil representing the operating vehicle engine which remains activated only if the capacitor has charged to a given voltage. Deactivation of the relay results in a simulated stall condition requiring the student to restart the simulator as he would restart a normal car.

In the Sheridan U.S. Pat. No. 3,266,173, a driver trainer somewhat similar to those described generally above is described and in this device a simulated stall condition is produced when the clutch pedal is released too rapidly. A rheostat is associated with the clutch pedal and has a range of resistance values which varies with clutch position. A capacitor is charged through yet another rheostat which is operated by the acceleration pedal, and this capacitance is similarly associated with the clutch pedal rheostat so that when the clutch pedal is disengaged too rapidly, the charge on the accelerator capacitor is bled off toward another capacitor resulting in a detectable electrical signal which is employed to indicate a stall condition.

The present invention is simpler, less expensive, and more reliable than the complex arrangement described in the Sheridan patent. Furthermore, as will be apparent from the discussion below, the novel arrangement of this application is particularly advantageous in that the circuit is only sensitive to the rate of pedal travel through the actual point of clutch engagement and is insensitive to the rate of travel at the beginning and end of the pedal swing. Further, there is perfect correlation to the friction point because the circuit switches are mechanically linked to the clutch pedal switch. In addition, the circuit is sensitive only to rapid clutch release and not to rapid clutch depression.

Many other objects and purposes of the invention will become clear from the following detailed description of the drawings.

DETAILED DESCRIPTION OF THE DRAWINGS

Figure 1:
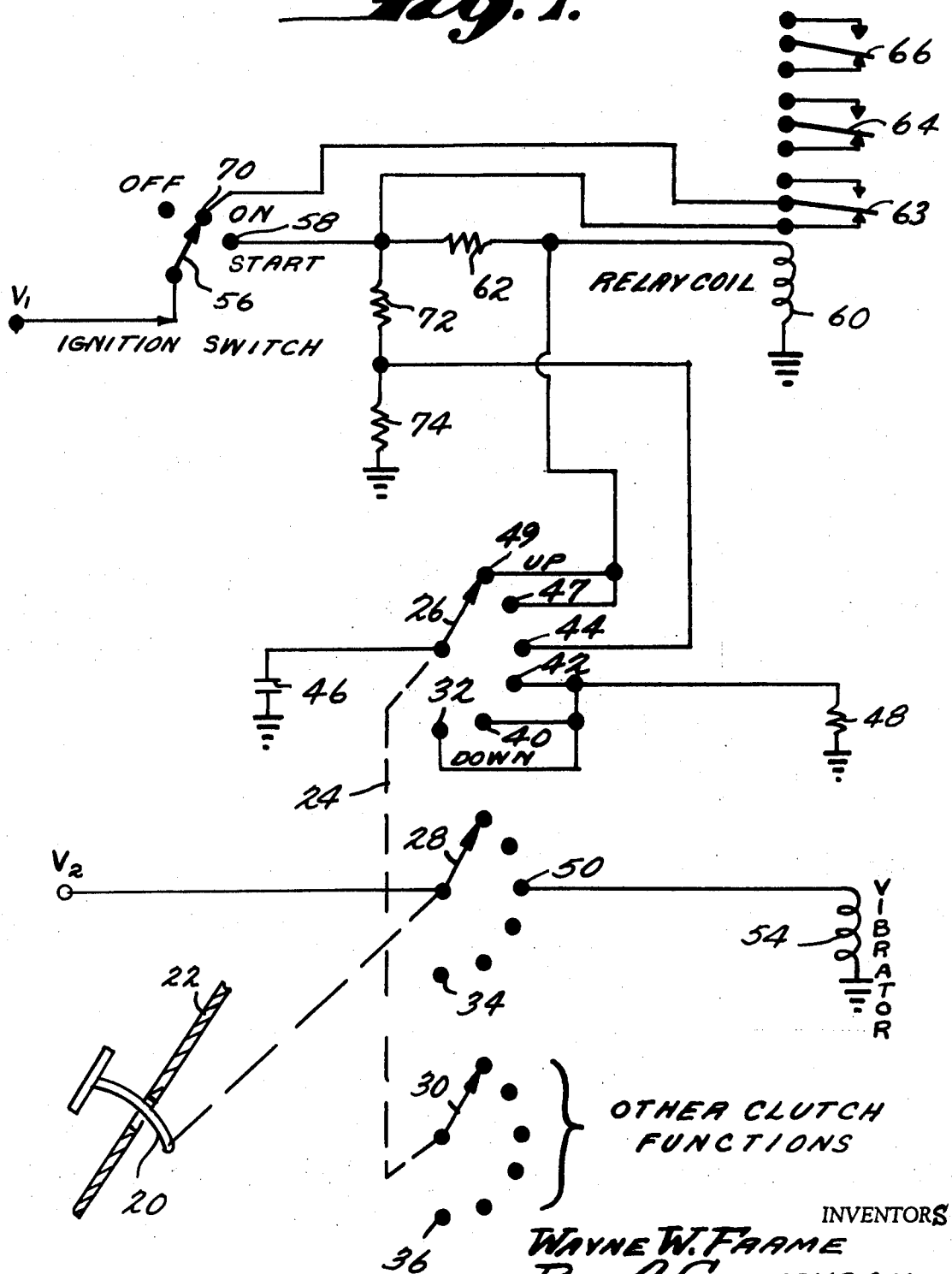
FIG. 1 shows a schematic of one embodiment of the invention.

Reference is now made to FIG. 1 which shows one embodiment of the novel invention of this application for detecting a simulated stall condition resulting from too rapid release of the clutch pedal as it passes the point of engagement. As mentioned briefly above, the clutch pedal 20 is one of the controls which the student operates as he learns to correctly perform the manipulations necessary to operate a motor vehicle. While the remainder of the controls normally employed in such a driver-simulator are not shown nor discussed in detail below, these controls are set forth in detail in the above-discussed Chedister patents, the disclosures of which are explicitly incorporated herein by reference.

As shown, clutch pedal 20 is movable through the simulated floorboards 22 by the foot of the student, and springs or other structures are preferably provided to constantly urge the clutch pedal 20 outward in the same fashion in an actual vehicle. Mechanically linked to the clutch pedal 20 by any suitable means is a switch 24 which is provided with three ganged arms 26, 28 and 30 which move together counterclockwise through a sequence of positions with the clutch pedal 20 as it is depressed and released. While the mechanical connection of switch 24 to clutch 20 is not shown, many ways in which pedal 20 and switch 24 can be connected together will be apparent and any appropriate means for making such a connection can be employed.

When clutch pedal 20 is completely depressed, arms 26, 28 and 30 of switch 24 will similarly be shifted to their lowest positions so that arm 26 will be electrically connected to contact 32 and arms 28 and 30 similarly connected to contacts 34 and 36, respectively. As clutch pedal 20 is released, arms 26, 28 and 30 move counterclockwise as the pedal moves upward so that arm 26, for example, sequentially connects to contacts 32, 40, 42, 44, 47 and 49. The contacts associated with arm 30 are connected to relays and/or other devices for simulating other clutch functions not relevant to the invention of this application.

Figure 2:
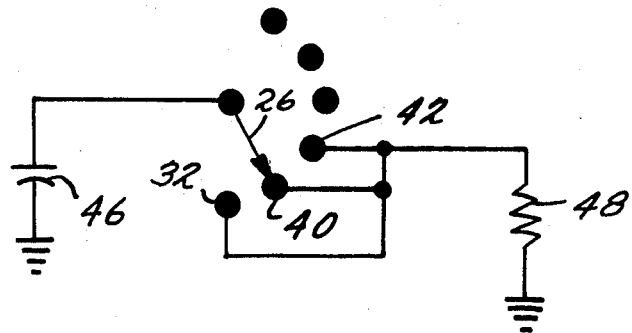
FIG. 2 shows the Thevenin equivalent of the circuitry of FIG. 1 when the clutch pedal is disengaged.

When the clutch pedal is depressed into disengaged portion of pedal travel, arm 26 is electrically connected to any of the contacts 32, 40 or 42, and capacitor 46, if charged, discharges quickly through resistor 48 which is chosen to have a value to expedite discharge and capacitor 46 thereafter remains discharged as long as arm 26 remains connected to any of the contacts 32, 40 or 42. The Thevenin equivalent of the circuit of FIG. 1 when the clutch pedal is disengaged and arm 26 is accordingly connected to any of the contacts 32, 40 or 42 is illustrated in FIG. 2.

When the clutch pedal is manually released in order to engage the clutch, arm 26 moves counterclockwise as clutch pedal 20 moves upward and, at the simulated point of engagement of the clutch, electrically connects to contact 44. At this point, arm 28 which is ganged for movement with arm 26 similarly is electrically connected to contact 50, completing a current path from a source of voltage $V_2$ to ground through a conventional vibrator 54 which is depicted as a coil. Vibrator 54 is provided in order to simulate the vibrating condition which results in an actual vehicle when the clutch is engaged and can be any suitable conventional vibrator of which several are readily available on the market.

Also at the point of simulated clutch engagement, capacitor 46 has been disconnected from resistor 48 and is now connected to a D.C. source of voltage $V_1$ via simulated ignition switch 56 which is manually operated by the student and which is shown in its "on" position. The simulated engine is initially started by shifting ignition switch 56 into connection with "start" contact 58, completing a current path through relay coil 60 via resistor 62. Relay coil 60 which represents the vehicle engine then responds by shifting the positions of its controlled switches 63, 64 and 66 into the positions illustrated in FIG. 1. The movement of switch 63 completes a latching current path through relay coil 60 via switch 63 so that when the student permits ignition switch 56 to return to the "on" position in connection with contact 70, current continues to flow through relay coil 60 and the controlled switches 63, 64 and 66 remain shifted into their illustrated positions.

Figure 3:
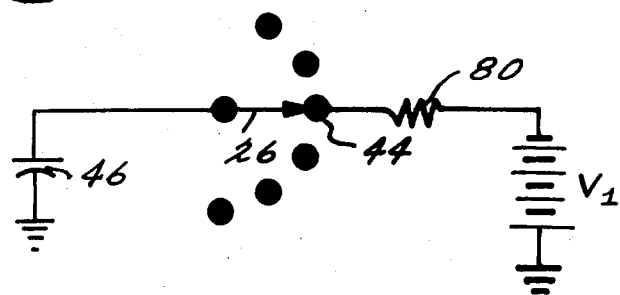
FIG. 3 shows a Thevenin equivalent of the circuit of FIG. 1 at point of engagement of the clutch pedal.

When arm 26 moves into connection with contact 44, a source of voltage is applied across capacitor 46, the amplitude of which depends upon the resistance ratio of the dividing resistances 72 and 74. The Thevenin equivalent of the circuit with arm 26 connected to contact 44 is illustrated in FIG. 3 with a single resistance 80 representing the resistance of the charging circuit. The voltage to which capacitor 46 charges is, of course, a function of the time which capacitor 46 is connected to source $V_1$ via arm 26.

Figure 4:
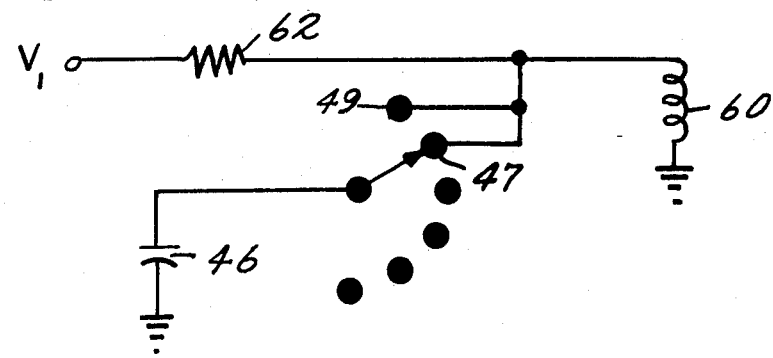
FIG. 4 shows a Thevenin equivalent of the circuit of FIG. 1 when the pedal is engaged.

As the clutch pedal is manually released beyond the point of engagement, arm 28 moves out of electrical connection with contact 50 and vibrator 54 ceases operation. At the same time, arm 26 moves into connection first with contact 47 and then with contact 49. Both contacts 47 and 49 are connected as shown to relay coil 60 so that when arm 26 moves into connection with contact 49 or 47, capacitor 46 is immediately connected in parallel with relay coil 60 via resistors 72 and 62. Capacitor 46 is also connected via resistor 62 to the source of voltage $V_1$ so that capacitor 46 instantaneously reduces the voltage across coil 60 to the value of the voltage across the capacitor 46 and at the same time begins charging through resistor 72. If the voltage across capacitor 46 when connected to coil 60 is less than the value necessary to keep coil 60 activated and remains less than value for the short time before coil 60 shifts its controlled switches from their illustrated positions, a simulated stall condition is produced by the deactivation of coil 60, and switches 64 and 66 are then connected to appropriate indicators or other devices to indicate and simulate a stall condition. FIG. 4 illustrates the Thevenin equivalent of the circuitry when the capacitor is connected to contact 47 or 49.

Accordingly, the above embodiment of the invention represents a relatively simple circuit for detecting a stall condition which is not only relatively inexpensive and reliable but which is also sensitive only to the rate of change of the pedal through the actual friction point of engagement and is completely insensitive at each end of pedal travel. Thus, the circuitry represents a more realistic detector of stall condition than other arrangements described above.

Many changes and modifications can, of course, be made in the embodiment of the invention described above, and the scope of the invention is intended to be limited only by the scope of the appended claims.

What is claimed is:

1. Apparatus for use in a driver trainer simulator having a clutch pedal for operation by the operator of the simulator and for simulating a stall whenever the clutch pedal is moved at a rate greater than a given rate through the engagement point from the disengaged portion of its travel to the engaged portion of its travel comprising:

simulating means having a first condition indicating the simulator is in simulated operation and a second condition indicating the simulator is not in simulated operation so that said simulating means shifts from said first to said second condition when a stall condition is simulated, switch means mechanically connected to said pedal and having an arm which connects to a first contact when said pedal is in the disengaged portion of its travel, connects to a second contact when said pedal is at the engagement point and connects to a third contact when said pedal is in the engaged portion of its travel, a capacitor connected to said arm so that said capacitor, if charged, is discharged when said arm is connected to said first contact, said capacitor is charged, when said arm is connected to said second contact, to a voltage dependent upon the time that said arm is connected to said second contact which is dependent upon the rate at which said pedal is moved through said engagement point, and said capacitor is connected to said simulating means when said arm is connected to said third contact so that, if the voltage across said capacitor is less than a given value, said value being the voltage to which said capacitor is charged when said arm is connected to said second contact and when said pedal moves through said engagement point at said given rate, said simulating means is shifted from said first to said second condition to simulate a stall condition.

2. Apparatus as in claim 1 wherein said switch means includes a second arm which connects to a fourth contact when said pedal is at the engagement point and including vibrating means connected to said fourth contact and operable when said second arm is connected to said fourth contact.

3. Apparatus as in claim 1 further including a first resistor connected to said first contact for discharging said capacitor.

4. Apparatus as in claim 1 wherein said simulating means is a relay.

5. Apparatus as in claim 4 wherein said relay includes a relay coil and a controlled switch having a first position when the relay is actuated and a second position when the relay is not actuated and further including a simulated ignition switch having a first position associated with non-operation of the simulator, a second position connecting a source of voltage to said relay coil via said controlled switch when said switch is in said first position and a third position connecting said source of voltage to said relay coil via a first resistor.

6. Apparatus as in claim 5 further including a second resistor connected to said third source of voltage when said switch is in said third position and a third resistor connected said second resistor with said second contact being connected to the point of connection between said second and third resistors so that when said arm is connected to said second contact said capacitor is connected to said coil via said first and second capacitors.

7. Apparatus as in claim 1 further including a resistor connected to said first contact for discharging said capacitor.

8. Apparatus as in claim 1 wherein said switch means includes a second arm ganged for movement with said first arm which connects to a sequence of contacts as said pedal is depressed and released and provides other simulated clutch functions.

9. Apparatus for use in a driver trainer simulator having a clutch pedal for operation by the operator of the simulator and for simulating a stall whenever the clutch pedal is moved at a rate greater than a given rate through the engagement point from the disengaged portion of its travel to the engaged portion of its travel comprising:

simulating means having a first condition indicating simulator is in simulated operation and a second condition indicating the simulator is not in simulated operation so that said simulating means shifts from said first to said second condition when a stall condition is simulated, a capacitor, and means associated with said pedal for discharging said capacitor when said pedal is in the disengaged portion of its travel, for charging said capacitor, when said pedal is at said engagement point, to a value which is a function of the rate at which said pedal is moved through said engagement point and for connecting said capacitor to said simulating means when said pedal is in the engaged portion of its travel so that, when said pedal has moved through the engagement point to the engaged portion of its travel, said simulating means shifts from said first to said second condition simulating a stall condition unless the charge on said capacitor exceeds a given value which is associated with said given rate.

10. A method of simulating a stall condition in a driver trainer simulator having a clutch pedal for operation by the operator of the simulator so that a stall condition is simulated whenever said clutch pedal is moved at a rate greater than a given rate through the engagement point from the disengaged portion of its travel to the engaged portion of its travel comprising the steps of:

discharging a capacitor when said pedal is in the disengaged portion of its travel, charging said capacitor when said pedal is at said engagement point to a value which is a function of the rate at which said pedal is moved through said engagement point and connecting, when said pedal has moved through said engagement point to the engaged portion of its travel, said capacitor to simulating means having a first condition indicating the simulator is in simulated operation and a second condition indicating the simulator is not in simulated operation so that said simulating means shifts from said first to said second condition simulating a stall condition unless the charge on said capacitor exceeds a given value which is associated with said given rate.

* * * * *